United States Patent
Frank

(10) Patent No.: US 11,901,133 B2
(45) Date of Patent: Feb. 13, 2024

(54) DENSE ENERGY STORAGE ELEMENT WITH MULTILAYER ELECTRODES

(71) Applicant: Blue Horizons Innovations, LLC, Coconut Creek, FL (US)

(72) Inventor: David L. Frank, Highland Beach, FL (US)

(73) Assignee: Blue Horizons Innovations, LLC, Coconut Creek, FL (US)

( * ) Notice: Subject to any disclaimer, the term of this patent is extended or adjusted under 35 U.S.C. 154(b) by 0 days.

(21) Appl. No.: 18/184,109

(22) Filed: Mar. 15, 2023

(65) Prior Publication Data

US 2023/0215658 A1 Jul. 6, 2023

Related U.S. Application Data

(60) Continuation-in-part of application No. 17/819,128, filed on Aug. 11, 2022, now Pat. No. 11,687,052.
(Continued)

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008* (2013.01); *H01G 4/1218* (2013.01); *H01G 4/232* (2013.01); *H01G 4/38* (2013.01)

(58) Field of Classification Search
CPC ........ H01G 4/30; H01G 4/008; H01G 4/1218; H01G 4/232; H01G 4/38
(Continued)

(56) References Cited

U.S. PATENT DOCUMENTS 3,416,207 A 12/1968 Maida
5,390,073 A 2/1995 McMillan
(Continued)

FOREIGN PATENT DOCUMENTS

WO 2015006030 1/2015

OTHER PUBLICATIONS

Vasylkiv et al. Nano-Blast Synthesis of Nano-size CeO2—Gd2O3 Powders. J. Am. Ceram. Soc., 89 [6] 1822-1826 (2006).
(Continued)

*Primary Examiner* — Arun Ramaswamy
(74) *Attorney, Agent, or Firm* — Fleit Intellectual Property Law; Jose Gutman

(57) ABSTRACT

An energy storage element and method of fabrication thereof are disclosed. An energy storage element includes a set of electrodes where one or more electrodes have extended conductive paths through nano-channel electric interconnections with ceramic particles in one or more dielectric layers. The electrode's electric field is extended into the dielectric material providing increased capacitance. The set of electrodes can include a pair of electrode layers respectively attached directly to opposing sides of one dielectric layer. The set of electrodes, which can also be referred to as multi-layer electrodes, can include a plurality of electrode layers interleaved between, and directly attached to, a plurality of stacked dielectric layers.

23 Claims, 10 Drawing Sheets

Related U.S. Application Data which is a continuation of application No. 17/665,043, filed on Feb. 4, 2022, now abandoned, which is a division of application No. 17/205,497, filed on Mar. 18, 2021, now Pat. No. 11,249,451, and a continuation of application No. PCT/US2021/022969, filed on Mar. 18, 2021, and a continuation-in-part of application No. 17/204,766, filed on Mar. 17, 2021, now Pat. No. 11,312,663, said application No. PCT/US2021/022969 is a continuation-in-part of application No. 17/204,766, filed on Mar. 17, 2021, now Pat. No. 11,312,663, and a continuation-in-part of application No. 17/101,001, filed on Nov. 23, 2020, now Pat. No. 11,257,630, and a continuation-in-part of application No. 16/824,364, filed on Mar. 19, 2020, now Pat. No. 10,961,158.

(60) Provisional application No. 63/430,102, filed on Dec. 5, 2022, provisional application No. 63/401,820, filed on Aug. 29, 2022, provisional application No. 63/130,940, filed on Dec. 28, 2020, provisional application No. 63/124,849, filed on Dec. 13, 2020, provisional application No. 63/081,523, filed on Sep. 22, 2020, provisional application No. 63/069,113, filed on Aug. 23, 2020, provisional application No. 63/056,662, filed on Jul. 26, 2020, provisional application No. 62/958,799, filed on Jan. 9, 2020, provisional application No. 62/942,154, filed on Dec. 1, 2019, provisional application No. 62/916,308, filed on Oct. 17, 2019, provisional application No. 62/912,420, filed on Oct. 8, 2019, provisional application No. 62/891,306, filed on Aug. 24, 2019, provisional application No. 62/859,739, filed on Jun. 11, 2019, provisional application No. 62/836,812, filed on Apr. 22, 2019, provisional application No. 62/820,971, filed on Mar. 20, 2019.

(51) Int. Cl.
*H01G 4/38* (2006.01)
*H01G 4/232* (2006.01)
*H01G 4/12* (2006.01)

(58) Field of Classification Search
USPC .................. 361/301.4, 303, 321.1, 311, 312
See application file for complete search history.

(56) References Cited

U.S. PATENT DOCUMENTS

| | | | |
|---|---|---|---|
| 5,470,583 | A | 11/1995 | Na et al. |
| 8,512,645 | B2 | 8/2013 | Lee et al. |
| 8,512,672 | B2 | 8/2013 | Lee et al. |
| 9,248,501 | B1 | 2/2016 | Johannes et al. |
| 10,941,464 | B1 | 3/2021 | Agarwal |
| 2002/0196957 | A1 | 12/2002 | Andersen |
| 2004/0174147 | A1 | 9/2004 | Vinciarelli |
| 2006/0083694 | A1 | 4/2006 | Kodas et al. |
| 2006/0120020 | A1 | 6/2006 | Dowgiallo, Jr. |
| 2008/0003364 | A1 | 1/2008 | Ginley et al. |
| 2008/0220153 | A1 | 9/2008 | Mukherjee et al. |
| 2009/0278211 | A1 | 11/2009 | Kim et al. |
| 2010/0172066 | A1 | 7/2010 | Baer et al. |
| 2011/0171364 | A1 | 7/2011 | Xing et al. |
| 2012/0171420 | A1 | 7/2012 | Molins et al. |
| 2013/0122331 | A1 | 5/2013 | McDonald |
| 2013/0320274 | A1 | 12/2013 | Walters |
| 2014/0022694 | A1 | 1/2014 | Reynolds et al. |
| 2014/0203763 | A1 | 7/2014 | Zhao et al. |
| 2014/0247004 | A1 | 9/2014 | Kari et al. |
| 2014/0374642 | A1 | 12/2014 | Shen et al. |
| 2015/0038593 | A1 | 2/2015 | Gogotsi et al. |
| 2016/0038745 | A1 | 2/2016 | Faltys et al. |
| 2016/0254092 | A1* | 9/2016 | Lazarev ............ C08G 73/1067 361/311 |
| 2017/0004929 | A1 | 1/2017 | Frank |
| 2017/0022608 | A1* | 1/2017 | King ....................... B22F 1/056 |
| 2017/0117818 | A1 | 4/2017 | Shao |
| 2017/0324057 | A1 | 11/2017 | Friend et al. |
| 2017/0330695 | A1 | 11/2017 | Frank |
| 2018/0134563 | A1 | 5/2018 | Mochalin et al. |
| 2019/0009330 | A1 | 1/2019 | King et al. |
| 2019/0304708 | A1 | 10/2019 | Turner et al. |
| 2021/0032166 | A1 | 2/2021 | Zeng et al. |

OTHER PUBLICATIONS

International Search Report dated Mar. 26, 2021 issued for International Application No. PCT/US20/61726.
Written Opinion of the International Searching Authority dated Mar. 26, 2021.
Kan et al., "Battery Capacitor Combinations in Photovoltaic Powered Products", Journal of Power Sources 2006 pp. 1-9 entirety of document especially p. 1 paragraph 1, 2006.
Wikipedia "Ceramic Capacitor" Nov. 18, 2016 (Nov. 18, 2016) retrieved from <https://en.wikipedia.org/windex.php?title=Ceramic_capacitor&oldid=750236745> entirety of document especially p. 3 paragraph 5 2018.
Wikipedia "Sol-gel Process" Nov. 23, 2018 (Nov. 23, 2018) retrieved from <https://en.wikipedia.orgiw/index.php?title.Aluminum_oxide&oldid=870135592> entirety of document especially p. 3, Table 1 2018.
Wikipedia "Aluminum Oxide" Nov. 22, 2018 (Nov. 22, 2018) retrieved from <https://en.wikipedia.orgiw/index.php?title.Aluminium_oxide&oldid=870135592> entirety of document especially p. 3 Table 1 2018.
Wikipedia "Calcium copper Titanate" Nov. 28, 2017 (Nov. 28, 2017) retrieved from ,https://en.wikipedia.org/w/index. php?title=Calcium_copper_titanate&oldid=812515889. entirety of document especially p. 1 Table 1 2017.
PCT Notification of Transmittal of International Search Report and The Written Opinion of the International Searching Authority dated Sep. 1, 2020.
PCT Notification of Transmittal of International Search Report and The Written Opinion of the International Searching Authority dated May 27, 2021.
PCT Notification of Transmittal of International Search Report and The Written Opinion of the International Searching Authority dated Nov. 21, 2017.
PCT/US2021/022969 International Search Report dated Feb. 16, 2022.
PCT/US2021/022969 Written Opinion dated Feb. 16, 2022.
Vander Wood, Tim B., Report of Results: MVA13345, Tem Characterization of Sintered Material, MVA Scientific Consultants, 9 Pages, Oct. 9, 2019.

* cited by examiner

DENSE ENERGY STORAGE ELEMENT WITH MULTILAYER ELECTRODES

BACKGROUND

The present disclosure generally relates to electrical energy storage systems, devices, and methods. More particularly, the present disclosure relates to dielectric energy storage devices that include individual internal barrier layer capacitor (IBLC) particles within the dielectric material for a dielectric energy storage device.

Current battery and rechargeable battery technologies do not lend themselves to a broad range of applications. Large and heavy batteries are applied to electric vehicles and contribute a significant portion of the weight of the vehicle to enable driving range. Miniature batteries have been developed in recent years to address miniature sensors and actuators such as biomedical devices and wireless communication systems.

In the middle are requirements for portable electronic devices such as cellphones and computers. Chemical battery technologies have limited numbers of charge cycles before degradation of the battery charge capacity and are typically limited to 4 volts or less per cell. Current capacitors have limited energy density and dissipate the stored charge quickly. Many important applications demand high energy density, high operating voltage per cell, and an extended battery life-cycle. Capacitor materials with effective energy storage capabilities are needed.

Therefore, a need exists to overcome the problems with the prior art as discussed above.

BRIEF SUMMARY

Various embodiments of the present invention include fabrication of electrical energy storage elements with micro-scale structures and nano-scale structures, which can utilize modern semiconductor fabrication methods and structures.

The present disclosure generally relates to dielectric energy storage devices including multilayer electrodes that have a primary electrode deposited on the surface of a dielectric material and also have secondary non-channels that are electrical paths that extend into the dielectric material. The dielectric material has particles that are comprised of internal barrier layer capacitors (IBLC) with a highly resistive outer shell. In a perovskite material the nano-channel electric pathways form around the IBLC particles. These nano-channel electric pathways extend the electric field into the dielectric material and directly charge the IBLC particles enhancing capacitance. In addition, a highly resistive layer can be applied to IBLC to restrict leakage current from passing out of the IBLC. These nano-channel electrical paths can be used to charge the individual IBLC particles. These features enable efficient energy storage in a ceramic capacitor device.

One or more dielectric materials and two or more electrodes are applied to create a Dielectric Energy Storage Element (DESE). Dielectric materials used for capacitors and energy storage devices are typically solid. Examples include, but are not limited to porcelain (ceramic), mica, glass, plastics, and the oxides of various metals. Electrodes for a capacitor and or an energy storage device may be metallic based such as, but not limited to, stainless steel plate, stainless steel, nickel, copper, gold, and titanium. Nonmetallic electrodes are neither metallic, nor semiconducting. Examples include, but are not limited to, conductive carbon, graphite and graphene. One or more DESE combine to create a Dense Energy Storage Device. One or more DESD combine to form a DESD Module.

The dielectric material for the DESE is comprised of many internal barrier layer capacitors with a highly resistive shell. The inventor calls the dielectric material a dielectric aggregate.

Metal electrodes can migrate into the base material they are deposited on.

Water based electrodes can also migrate into the dielectric material. These Multilayer Electrodes are comprised of surface electrodes with extensions into the dielectric material.

The extension of the electrodes into the dielectric material provides a Multilayer Electrode that operates as an electrode on the surface of the dielectric material and with extended electrical paths into the dielectric material.

In the DESE, metallic electrodes, especially silver and nickel can migrate into the dielectric energy storage layer. Metal electrodes migrate into many materials including oxides such as $CCTO/Al_2O_3@SiO_2$ $CCTO/Al_2O_3$, CCTO, $BaTiO_3$, $Al_2O_3$ and $SiO_2$. Bridging and shorting of the electrodes is possible along with a decrease in insulation resistance between the opposing electrodes. Graphene electrodes are nonmetallic and do not migrate and can eliminate the issue of metal migration. Applying a small amount of metal in a nonmetallic conducting material such as conductive carbon, graphite or graphene can control the metal migration forming an effective Multilayer Electrode enable an intimate contact between the electrode and dielectric material. Metal migration can also be controlled by combining oxidized material(s) in the metallic electrode solution. This controlled amount of metal migration can enhance capacitance in a dielectric energy storage layer comprised of materials such as CCTO, $BaTiO_3$, $CCTO/Al_2O_3$ or $CCTO/Al_2O_3@SiO_2$.

The dielectric material described herein is comprised of Internal Barrier Layer Capacitor (IBLC) particles with a resistive material shell surrounding the particles. The insulated IBLC particles are called Dielectrums and are packed together as agglomerate of individual Dielectrums.

The Dielectrum particles provides unique characteristics when applied with a multilayer electrode where electrically conductive nano channels form around the Dielectrum particles and connect to the surface electrodes of the dielectric material. Dielectrum particles can be designed as ultra-fine particles of less than 20 nm in diameter or larger particles of less than 20 microns in diameter.

An interesting phenomenon, according to various embodiments, is that the nano-channel electrical paths that extend from the multilayer electrode into the dielectric material and around the IBLC particles boost the dielectric capacitance by up to 100 times.

The electrical pathways wrap around the individual IBLC particles in our proprietary dielectric material. The IBLC particles in our dielectric material form individual internal barrier layer capacitors (IBLC). The barrier layer of the IBLC and the $SiO_2$ coating enhance the resistivity of each IBLC grain.

Each grain (IBLC) has a high level of capacitance allowing a high level of potential energy storage.

The amount of energy stored in each grain can be controlled by the combined resistivity of the barrier layer and the $SiO_2$ coating for each IBLC particle as they establish the breakdown voltage across the IBLC particles.

By increasing the $SiO_2$ coating, one can increase the amount of charge that is stored in each IBLC particle.

The inventor estimates that the charge voltage could be as high as 800 VDC.

Several low voltage DEUC prototypes fabricated in the lab are currently operating at a charge of 400 VDC and 200 VDC. At 400 VDC, one can provide a ~88% depth of discharge with an output voltage of 48 VDC.

A lithium-ion battery discharged at greater than 50% is subject to degradation of stored charge and shortened life cycle. The best lithium-ion batteries have a 4 VDC output. Lithium-ion batteries with a normal charge rate of 4 to 5 hours have a 95% efficiency. When fast charged, the lithium-ion battery results in degradation, decreased efficiency, and potential damage.

The DEUC is based on a ceramic capacitor design that enables recharge cycles of up to 500,000. Lithium-ion batteries have recharge cycles of 2,000 or less.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1B:
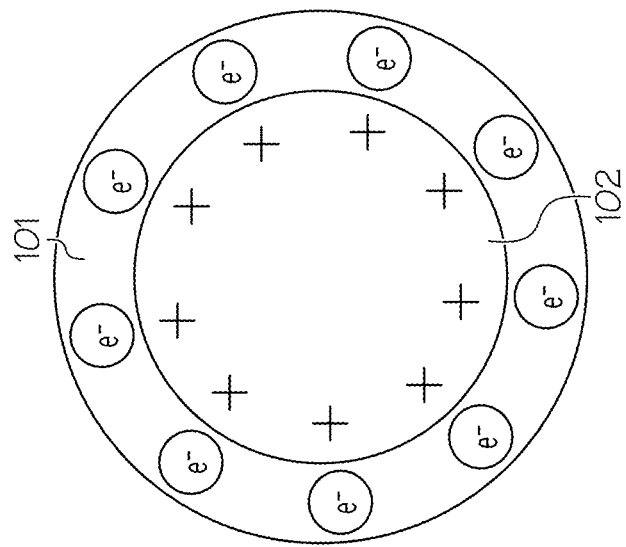
FIG. 1B is an illustration of an example of a semiconductor grain particle in the Internal Barrier Layer Capacitor (IBLC) material of FIG. 1A.

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any proprietary detailed structure and function. Further, the terms and phrases used herein are not intended to be limiting, but rather, to provide an understandable description. Additionally, unless otherwise specifically expressed or clearly understood from the context of use, a term as used herein describes the singular and the plural of that term.

The terms "a" or "an", as used herein, are defined as one or more than one. That is, the singular forms "a", "an", and "the" are intended to include the plural forms as well, unless the context clearly indicates otherwise. The term "plurality", as used herein, is defined as two or more than two. The term "another", as used herein, is defined as at least a second or more. The terms "including" and "having," as used herein, are defined as comprising i.e., open language. The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

The terms "controller", "computer", "server", "client", "computer system", "computing system", "personal computing system", or "processing system" describe examples of a suitably configured processing system adapted to implement one or more embodiments of the present disclosure. Any suitably configured processing system is similarly able to be used by embodiments of the present disclosure. A processing system may include one or more processing systems or processors.

A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources. The terms "wireless network", "wireless communication network", and "wireless communication system", similarly describe a network and system that communicatively couples computers and devices primarily or entirely by wireless communication media. The terms "wired network" and "wired communication network" similarly describe a network that communicatively couples computers and devices primarily or entirely by wired communication media.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be understood that the various layers and/or regions shown in the accompanying drawings are not drawn to scale, and one or more layers and/or regions may not be explicitly shown in a given drawing. This does not imply that the layers and/or regions not explicitly shown are omitted from the actual devices and structures. In addition, certain elements may be left out of particular views for the sake of clarity and/or simplicity when explanations are not necessarily focused on the omitted elements. Moreover, the same or similar reference numbers used throughout the drawings are used to denote the same or similar features, elements, or structures, and thus, a detailed explanation of the same or similar features, elements, or structures will not be repeated for each of the drawings.

Various embodiments of the present invention can be implemented in connection with semiconductor structures, elements, and related semiconductor fabrication processes.

It is understood that when an element such as a layer, region, or substrate is referred to as being "on" or "over" or "adjacent to" another element, it can be directly on, over, or adjacent to, the other element or intervening elements may also be present. Similar but inverse meaning will be understood for an element such as a layer, region, or substrate that is referred to as being "under" or "below" another element. It can be directly under the other element or intervening elements may also be present. In contrast, when an element is referred to as being "directly on" or "directly over" or "directly adjacent to", or if it is referred to as being "directly under" or "directly below" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, "vertical" refers to a direction perpendicular to a substrate in the views shown herein, e.g., cross-sectional and three-dimensional views herein. Current between electronic contacts, whether semiconductor or metal contacts, may be described herein as flowing in a vertical direction (e.g., between a bottom contact or layer and a top contact or layer) through conductive interconnection (e.g., metal interconnection wire). As used herein, "horizontal" refers to a direction parallel to a substrate in the in the views shown herein, e.g., cross-sectional and three-dimensional views herein.

As used herein, "thickness". "thick", or the like, refers to a size of an element (e.g., a layer, etc.) such as in a cross-sectional view, measured from a bottom surface to a top surface, or from a left side surface to a right side surface of the element, and/or measured with respect to a surface directly adjacent to and contacting the element (e.g., a surface on which the element is directly disposed on).

Unless otherwise specified, as used herein, "height" or "height above a substrate or layer" refers to a vertical size of an element (e.g., a layer, trench, via hole, etc.) such as in a cross-sectional view, measured from a top surface of the substrate to a top surface of the element. A thickness of an element can be equal to a height of the element if the element is directly on the substrate.

As used herein, the terms "lateral," "lateral side," "lateral surface" refer to a side surface of an element (e.g., a layer, opening, etc.), such as a left or right side surface, e.g., in a cross-sectional view shown herein.

As used herein, the terms "width" or "width value", and the like, refer to a distance from a start point on a first structure to an end point on the same structure, in a critical dimension. There can be specified a vertical width (e.g., a thickness) of the structure or a horizontal width of the structure.

The present disclosure, according to various embodiments, generally relates to multilayer electrodes that have a primary electrode deposited on the surface of a dielectric material and also have secondary nano-channels that are electrical paths that extend into the dielectric material. The dielectric material has particles that are comprised of internal barrier layer capacitors (IBLC) with a highly resistive outer shell. In a perovskite material the nano-channel electric pathways form around the IBLC particles. These nano-channel electric pathways extend the electric field into the dielectric material and directly charge the IBLC particles enhancing capacitance. In addition, a highly resistive layer can be applied to IBLC particles to restrict leakage current from passing out of the IBLC particles.

One or more dielectric materials and two or more electrodes are applied to create a Dielectric Energy Storage Element (DESE). Dielectric materials used for capacitors and energy storage devices are typically solid. Examples include, but are not limited to, porcelain (ceramic), mica, glass, plastics, and the oxides of various metals. Electrodes for a capacitor and/or an energy storage device may be metallic based such as, but not limited to, stainless steel plate, stainless steel, nickel, copper, gold, and titanium. Nonmetallic electrodes are neither metallic, nor semiconducting. Examples include, but are not limited to, conductive carbon, graphite and graphene. One or more DESE combine to create a Dense Energy Storage Device. One or more DESD combine to form a DESD Module.

Metal electrodes can migrate into the base material they are deposited on. Migration can cause catastrophic shorting of the electrodes across the dielectric material.

The metal migration can be controlled to provide an extension of the nano-channel electric pathways into the dielectric material and avoid shorting across the opposing electrodes. The secondary electrode creates an extended electrical field into the dielectric material. According to various embodiments, multilayer electrodes are comprised of surface electrodes with extensions into the dielectric material.

The multilayer electrodes provide high capacitance and maintain dielectric material resistivity and high breakdown. These features enable efficient energy storage in a single layer ceramic capacitor and a multilayer ceramic capacitor.

In the DESE, metallic electrodes, especially silver and nickel can migrate into the dielectric energy storage layer. Metal electrodes migrate into many materials including oxides such as $CCTO/Al_2O_3@SiO_2CCTO/Al_2O_3$, CCTO, $BaTiO_3$, $Al_2O_3$ and $SiO_2$.

Graphene and graphite electrodes are nonmetallic and do not, on their own, migrate and can eliminate the issue of metal ion migration.

Water based electrode paste can migrate into a perovskite dielectric material forming nano-channels that extend from the surface portion of the electrode. These nano-channels are electrically conductive. These nano-channels carry voltage from the surface portion of the electrode down into the dialectic material and deliver charge to the individual IBLC particles.

Applying a small amount of metal in a nonmetallic conducting material such as conductive carbon, graphite or graphene can control the metal migration forming an effective Multilayer Electrode enable an intimate contact between the electrode and dielectric material. Metal migration can also be controlled by combining oxidized material(s) in the metallic electrode solution. This controlled amount of metal migration can enhance capacitance in a dielectric energy storage layer comprised of materials such as CCTO, BaTiO3, CCTO/$Al_2O_3$ or CCTO/$Al_2O_3$@$SiO_2$.

Barrier layers can be used to block the metal migration into the dielectric material. The barrier lays can also be placed into the dielectric material to enable extended nano-channel electric pathways to a specific depth into the dielectric material. Typical barrier layer materials for capacitors include metal oxides.

Figure 1A:
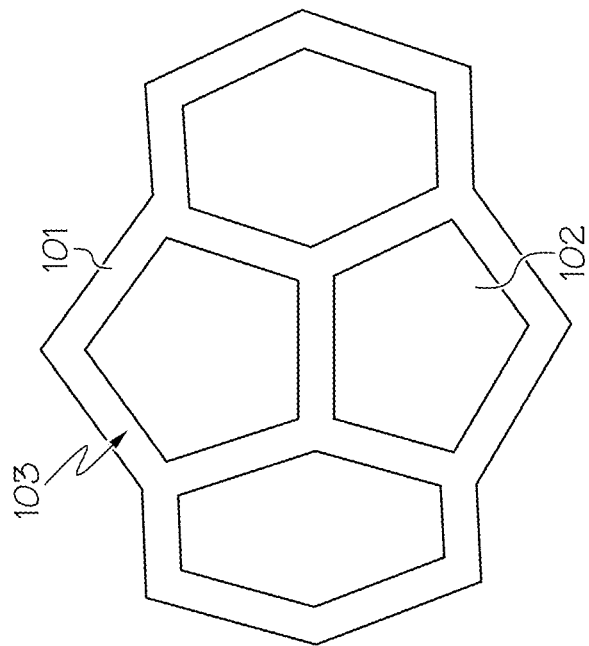
FIG. 1A is an illustration of an example of an Internal Barrier Layer Capacitor (IBLC) material.

FIGS. 1A and 1B illustrate CCTO as a barrier layer capacitor material (IBLC). The semi-conductor grain 102, which may also be referred to as a particle, of this perovskite IBLC material has a lower resistance than the grain boundary 101. An inter-grain region 103 is located in between the particles 102 where material can be applied to form a core shell configuration.

Figure 2:
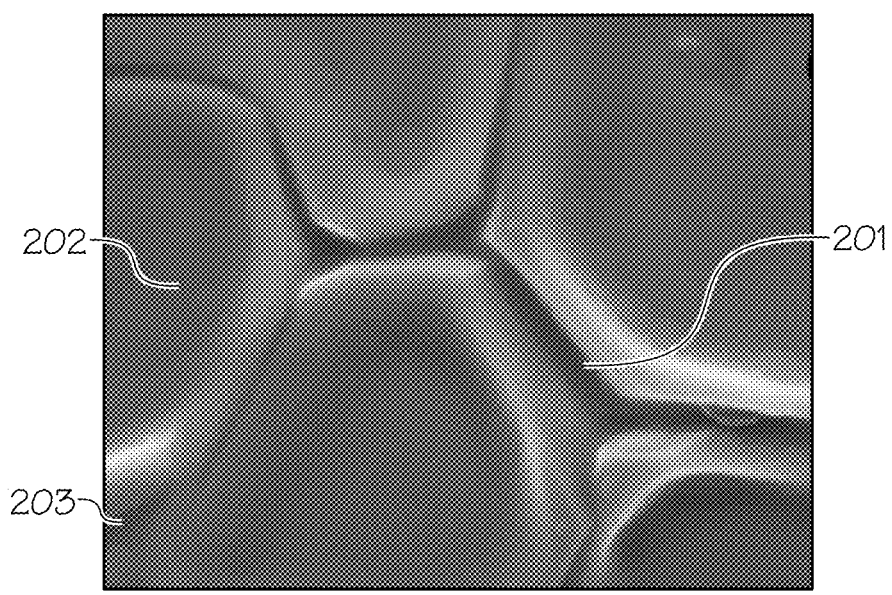
FIG. 2 is an illustration of an example of multiple IBLC particles in semiconductor material.

FIG. 2 illustrates an example of multiple IBLC particles 202, the grain boundary 201 and the inter-grain region 203. The highly resistive materials are applied to the grain boundary forming a grain boundary compound. The highly resistive materials also fill the inter-grain regions 203. The grain boundary 201 compound is interconnected to the resistive material in the inter-grain region 203.

This provides a highly resistive grain boundary 201 for increased IBLC permittivity, high internal resistivity for low leakage current, and high breakdown voltage.

Figure 3:
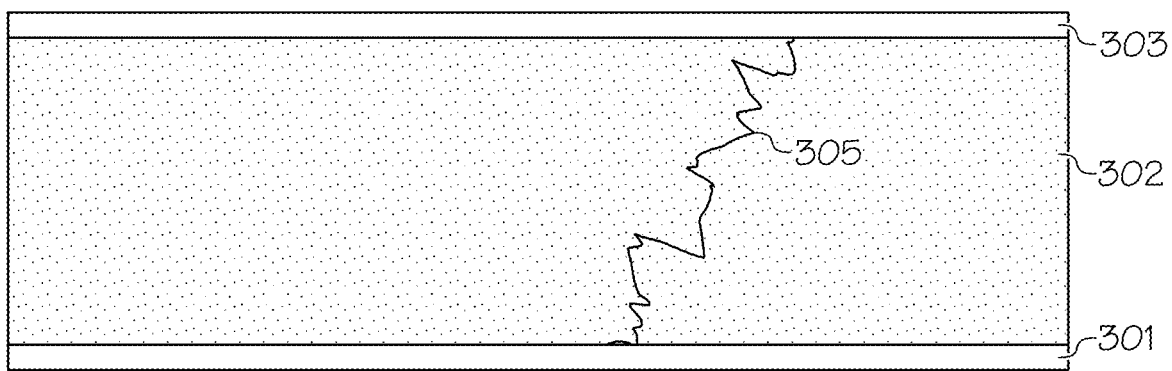
FIG. 3 is an illustration of a cross-sectional view of a single layer energy storage element, e.g., a single layer ceramic capacitor, showing electric micro-channels in dielectric material in the single layer ceramic capacitor.

In FIG. 3 we illustrate an example of a single layer ceramic capacitor with dielectric material 302 and opposing electrodes/terminals 301, 303, with electric micro-channels 305 that extend into the dielectric material 302 between the opposing electrodes/terminals 301, 303. In this example, electrodes/terminals 301, 303, can be applied to the single layer ceramic capacitor.

Figure 4:
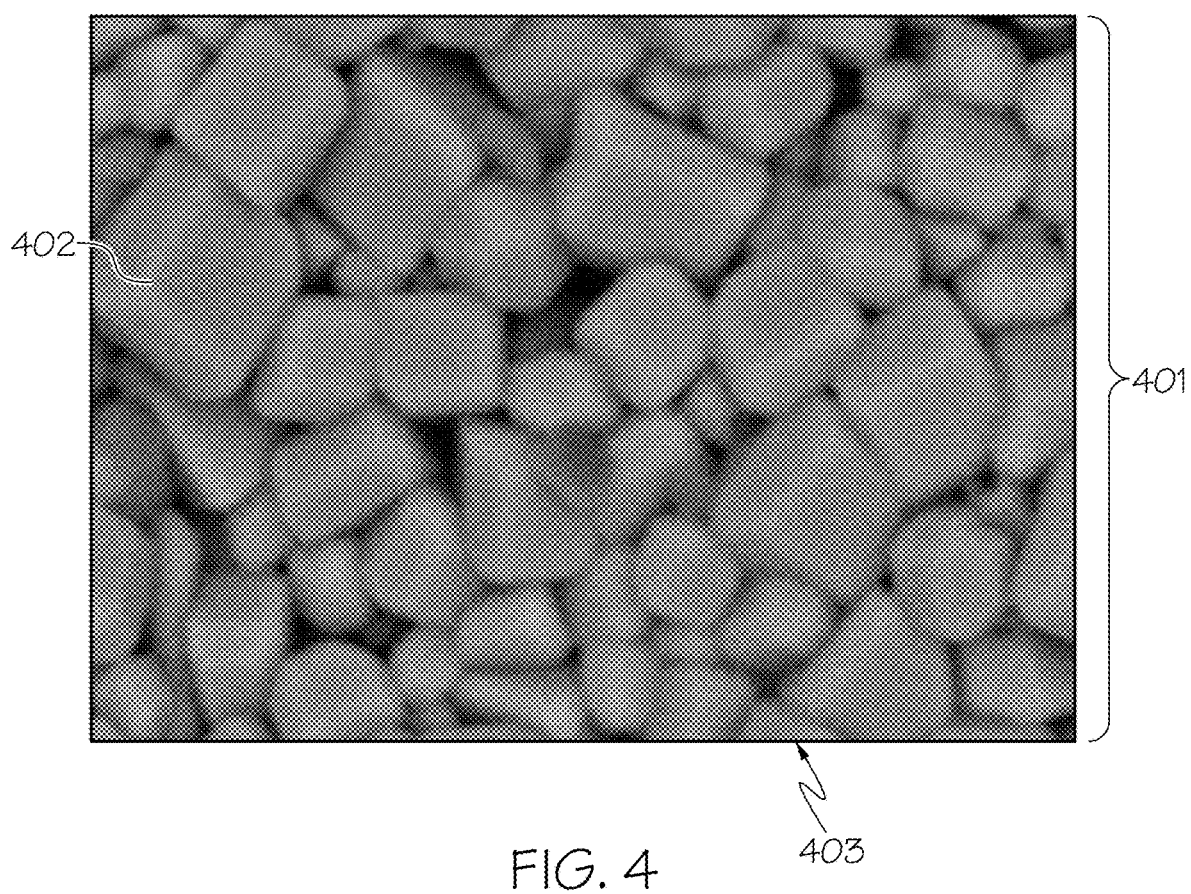
FIG. 4 is an illustration of an example of an IBLC particle agglomerate in dielectric material.

FIG. 4 illustrates an IBLC Particle Agglomerate 401 where individual IBLC Particles 402 are grouped together in a dielectric material 403.

Figure 5:
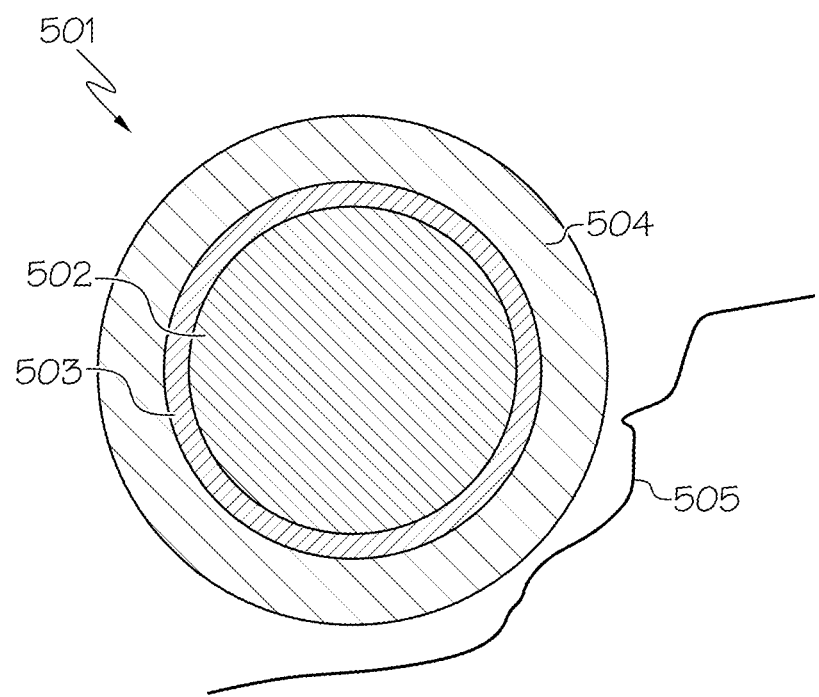
FIG. 5 is an illustration of an example of a dielectric IBLC particle showing its various components.

FIG. 5 illustrates an example of a dielectric IBLC particle 501 comprised of an internal barrier layer capacitor 501 with a resistive shell 504. The internal barrier layer capacitor (IBLC) has a core 502 and a barrier layer 503. The IBLC is an individual capacitor that, for example, has a diameter of from 6 nm to 10 microns. The highly resistive shell 504 can be formed, for example, with a thickness of between 1% to 50% of the measured IBLC diameter. The IBLC capacitor 501 stores dielectric energy, and the resistive shell 504 mitigates leakage current out of the IBLC capacitor 501. One or more electric micro-channels 505, which can also be referred to herein as electric nano-channels 505, can extend into dielectric material that includes one or more IBLC particles 501.

The electric micro-channels 505 provide conductive paths between opposing electrodes/terminals 301, 303, as illustrated in FIG. 3. Under certain charging conditions between opposing electrodes/terminals 301, 303, of opposite polarities can charge IBLC particles 501 in the dielectric material.

For example, as shown in FIG. 5, a micro-channel 505 that extends in dielectric material in close proximity to the IBLC particle 501 can provide electric charge across the dielectric material sufficient to charge the IBLC particle 501. That is, the micro-channel 505 in close proximity to the IBLC particle 501 in an energy storage element facilitates applying a charge across the dielectric material to charge the IBLC particle 501 while the energy storage element is in a charging state.

Figure 6:
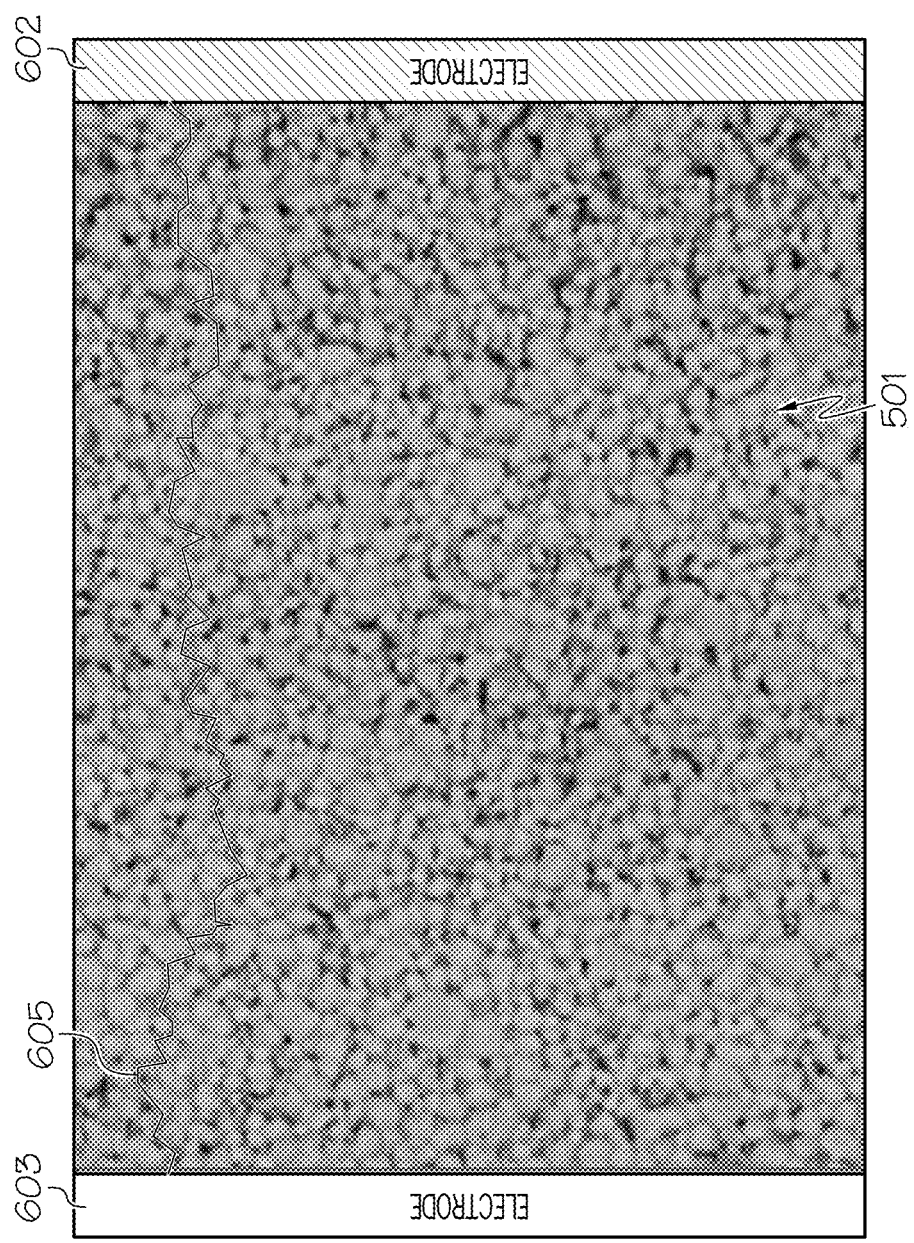
FIG. 6 is an illustration of an example of an energy storage element including multilayer electrodes and showing electric nano-channels extending from the multilayer electrodes into the dielectric material comprised of many IBLC particles.

FIG. 6 illustrates an example of an energy storage element including dielectric material comprised of many IBLC particles 501. The dielectric material is shown, in the example, between a pair of opposing electrodes 602, 603, of different polarities. For example, the right-most electrode 602 can be a positive polarity (voltage) while the left-most electrode 603 can be a negative polarity. According to various embodiment, these electrodes 602, 603 are multilayer electrodes where electric nano-channels 605 can extend through the dielectric material, as shown, from a first surface electrode/terminal 602 to a second surface electrode/terminal 603. The electric nano-channels 605 can deliver a charge directly to the IBLC particles 501.

According to various embodiments, one or more IBLC particles 501 have a resistive shell and are packed together as an agglomerate of individual IBLC particles 501. Each IBLC particle 501 can release electric energy during a self-discharge state for the energy storage element. This electric energy passes around the one or more IBLC particles 501 via the electric nano-channels 605 which provides a regenerated charge into said IBLC particles 501 as the electric energy moves through the dielectric material, such as from a first to a second surface electrodes 602, 603.

Figure 7:
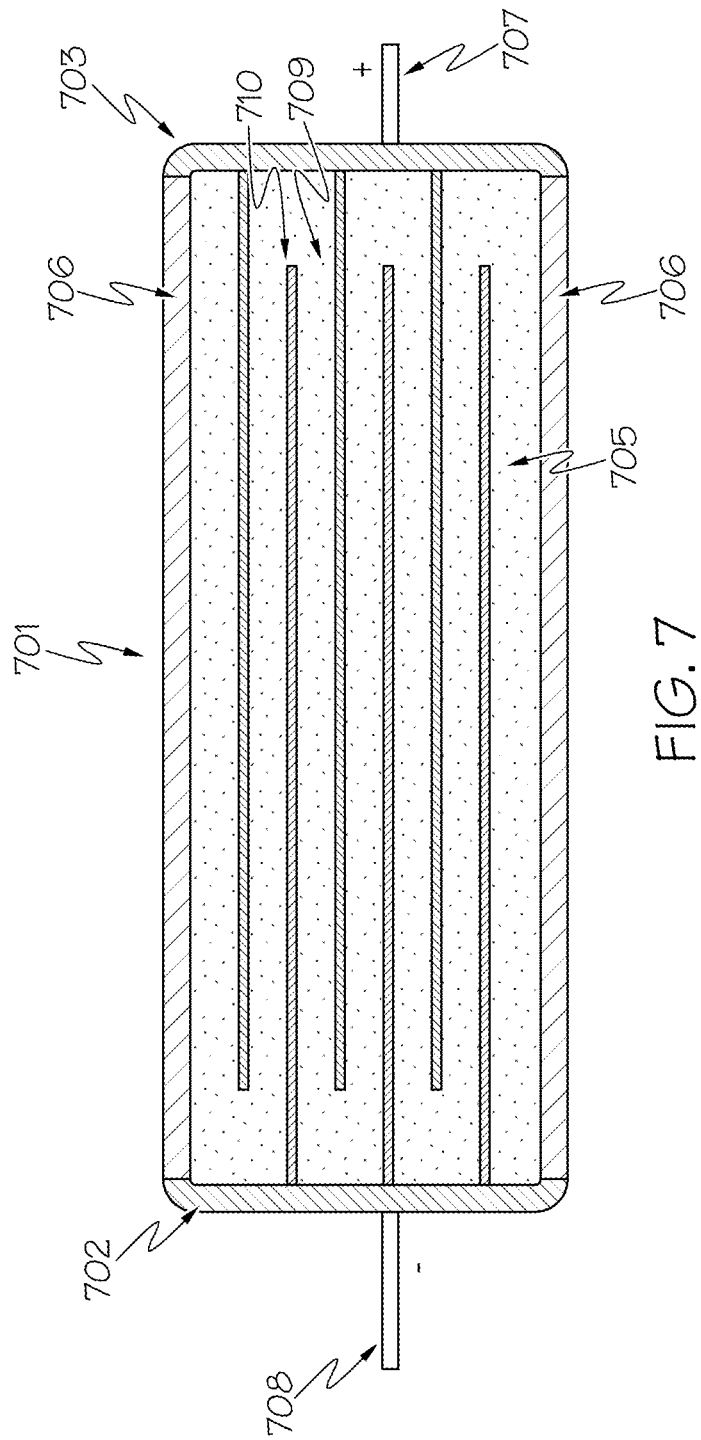
FIG. 7 is an illustration of a cross-sectional view of an example energy storage element including internal multilayer electrodes connected to outer terminals, with the energy storage element in a non-charging state.

FIG. 7 illustrates an example of an energy storage element where a dielectric material 705 is comprised of IBLC particle agglomerates 705. The energy storage element is in an idle (non-charging) state 701. Multilayer inner electrodes 709, 710, include a set of electrode layers that is connected to respective positive and negative surface electrodes/terminals 702, 703, as shown. The positive surface electrode/terminal 703 is electrically connected to an external positive terminal 707. The negative surface electrode/terminal 702 is electrically connected to an external negative terminal 708. An outer insulator, which is a highly resistive material 706, is applied as a coating across the outside of the dielectric material 705.

Figure 8:
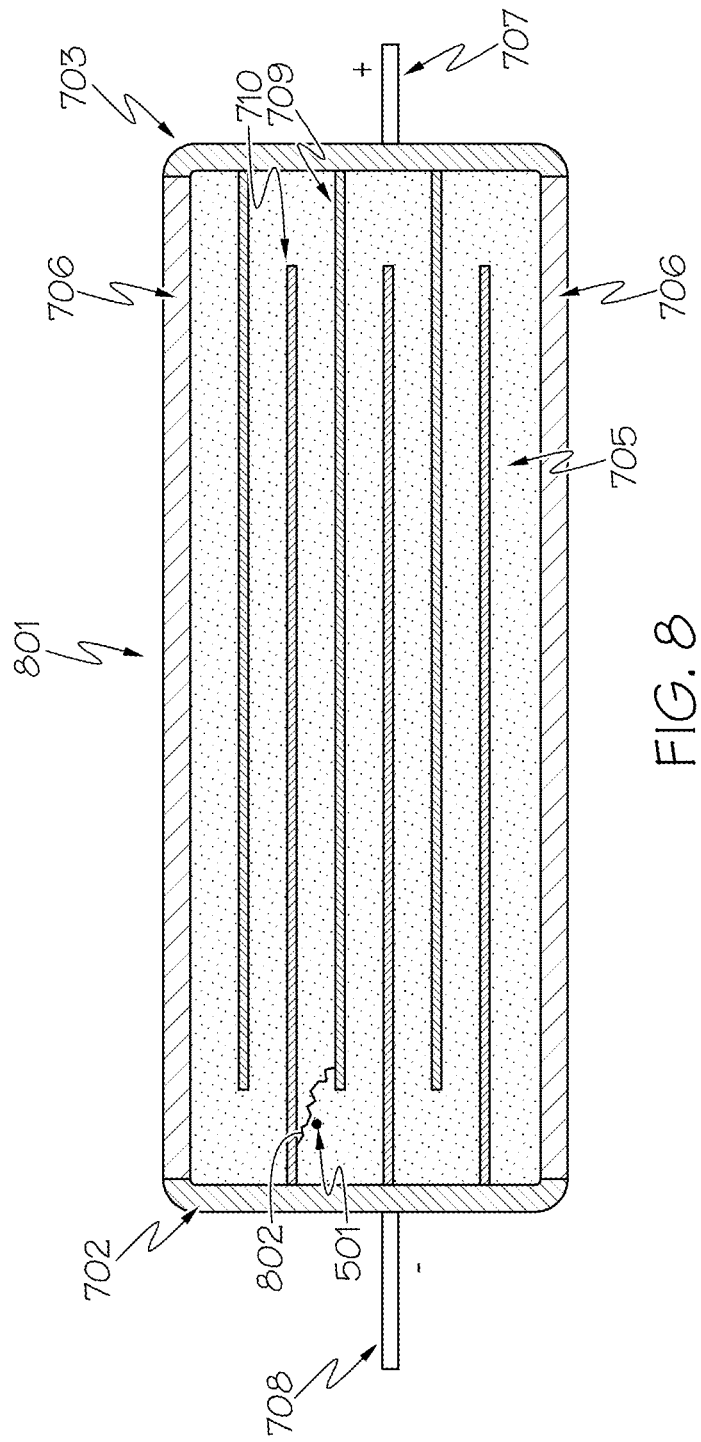
FIG. 8 is an illustration of a cross-sectional view of the example energy storage element of FIG. 7 in a charging state.

FIG. 8 illustrates the example IBLC Energy Storage Element shown in FIG. 7 during a charging state 801. The IBLC particles 501 form the dielectric material 705 comprised of IBLC particle agglomerates. Both the multilayer inner electrodes 709, 710, and the negative and positive surface electrodes 702, 703, can provide nano-channel electrical connections 802 extending into the dielectric material 705. In the specific example shown in FIG. 8, the set of electrodes comprising positive and negative multilayer inner electrodes 709, 710, are provided with at least one nano-channel 802 electrical interconnection extending in the dielectric material 705 between the electrodes 709, 710. The outer insulator (highly resistive material 706) coating across the outside of the dielectric material 705 provides electrical insulation for the IBLC Energy Storage Element. The IBLC particles 501 are shown as an agglomerate 705. The nano-channels 802 across the dielectric material 705, in the charging state 801, provide electric charge distribution across the IBLC particles 501 in the agglomerates 705 which can charge the individual IBLC particles 501.

Figure 9:
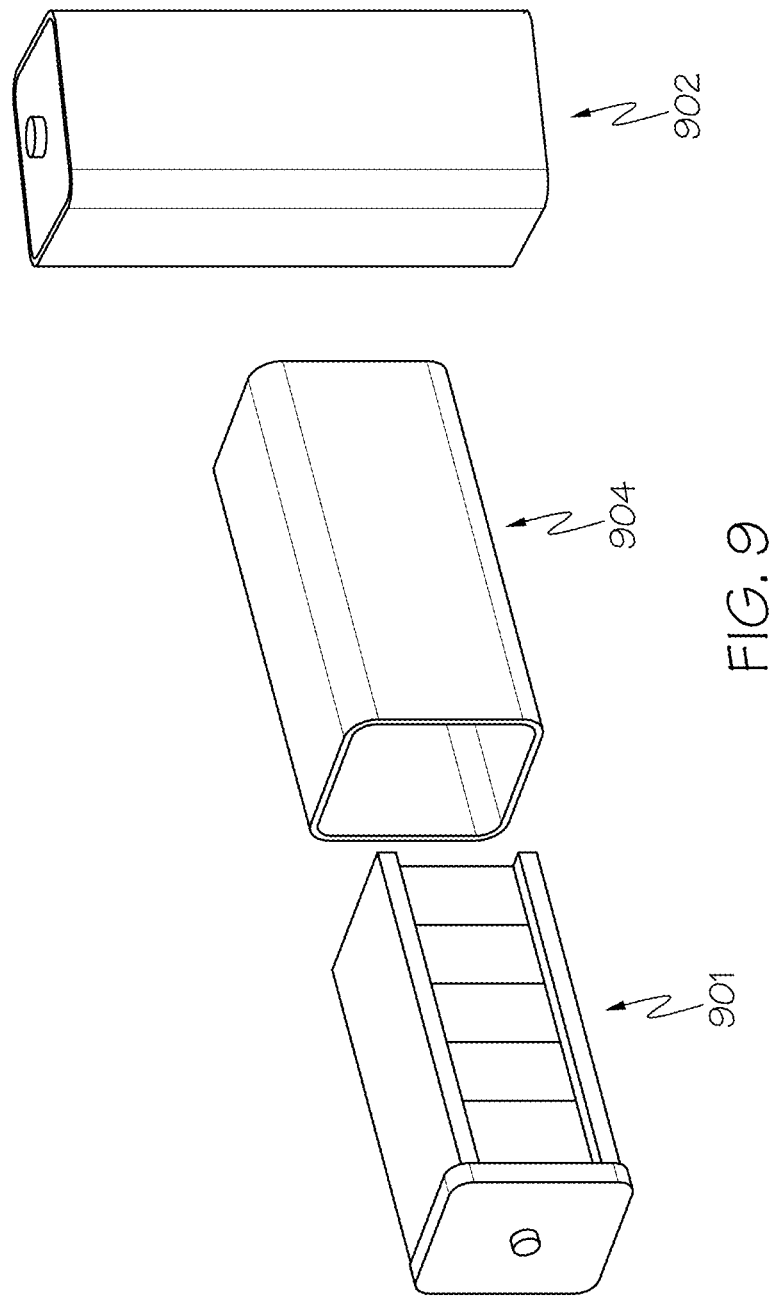
FIG. 9 is an illustration of an example method of stacking Dense Energy Storage Elements to form a Dense Energy Storage Module.

FIG. 9 illustrates an example method of stacking Dense Energy Storage Elements 901 and then inserting the stacked dense energy storage elements 901 into a protective and insulating housing 904, to form a Dense Energy Storage Module 902.

Figure 10:
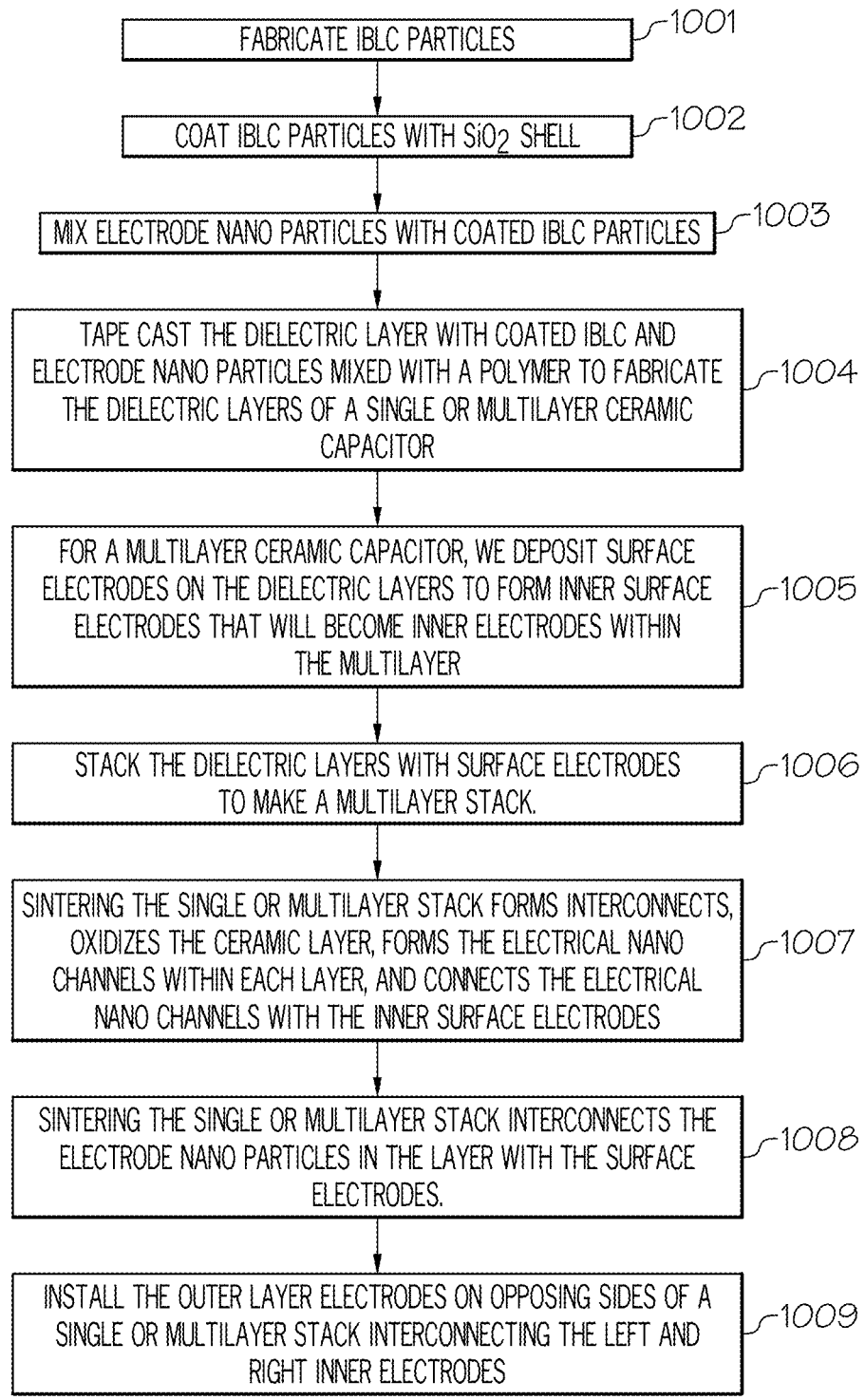
FIG. 10 is an operational flow diagram illustrating an example method for fabricating a Dense Energy Storage Element with multilayer electrodes.

FIG. 10, with reference to FIGS. 3 and 8, illustrates an example fabrication method suitable for fabricating a Dense Energy Storage Element with Multilayer Electrodes. The example fabrication method is entered, at step 1001, and fabricates IBLC particles 501, in a process as has been discussed above. The method coats, at step 1002, the IBLC particles 501 with an insulating $SiO_2$ shell. According to the example method, at step 1003, electrically conducting nano-particles are mixed into the ceramic material including the coated IBLC particles. The method, at step 1004, mixes a polymer with the ceramic material comprising the electrically conducting nano-particles mixed into the ceramic material including the coated IBLC particles. The method then uses a tape casting process and applies single layer or multilayer ceramic capacitor fabrication methods to the ceramic material to fabricate single layer or multi-layer ceramic capacitors. The ceramic material is comprised of internal barrier layer (IBLC) particles that are coated with an insulating $SiO_2$ shell, and are mixed with the electrically conducting nano-particles and the polymer material.

Surface electrodes are deposited, at step 1005, on the individual dielectric layer(s). When the dielectric layers are stacked together the surface electrodes, interleaved between stacked dielectric layers, will become inner electrodes within a multilayer ceramic capacitor. That is, the one or more dielectric layers, with surface electrodes, are stacked, at step 1006, to form a capacitor (e.g., when there is only one dielectric layer with two opposing surface electrodes) or to form a multilayer capacitor (e.g., when a plurality of dielectric layers are interleaved with one or more inner electrodes).

When sintered, at steps 1007 and 1008, the electrically conducting nano-particles in the dielectric layer(s) form electric nano-channels that extend into the dielectric material around the coated IBLC particles and connect to the surface electrodes of the dielectric material layer(s). That is, in the case of a single layer capacitor, the ceramic dielectric material after being sintered forms the capacitor with surface electrodes on opposing sides of the dielectric layer, and including the electric nano-channels that extend into the dielectric material around the coated IBLC particles and connect to the surface electrodes. In the case of a multilayer capacitor, the plurality of sintered dielectric material layers are stacked together with interleaving inner electrodes, and including the electric nano-channels that extend into the dielectric material around the coated IBLC particles and connect to the surface electrodes and/or the inner electrodes.

For a single layer ceramic capacitor (SLMC) opposing terminals/electrodes 301, 303, are applied, at step 1009, to the dielectric material 302.

For a multilayer ceramic capacitor (MLCC), outer terminals/electrodes 702, 703, are installed on opposing ends of the MLCC to interconnect and collect the left-side inner electrodes 710 and the right-side inner electrodes 709. These outer terminals/electrodes 702, 703, can also be referred to as collectors.

In a MLCC, the inner electrodes 709, 710, are interleaved in between the dielectric layers and alternatively provide right 709 and left 710 inner electrodes to be collected by collectors including the outer right terminal 703 and the outer left terminal 702. In FIG. 8, for example, the outer left terminal 702 is negative electric polarity and the outer right terminal 703 is positive electric polarity. Other methods of capacitor fabrication may be used with this addition of electrically conducting nano-particles mixed into the dielectric material.

The dielectric energy storage material can be configured as one or more thick films or in a single or multilayer ceramic capacitor configuration. The Left and Right DESE Electrodes can be multilayer electrodes.

The dielectric material in an example embodiment is $CCTO/Al_2O_3@SiO2$ and the nano-channel electrical pathways that extended electrical fields around the IBLC particles of the $CCTO/Al_2O_3@SiO_2$ enhance the capacitance. The dielectric is not restricted to $CCTO/Al_2O_3@SiO_2$ and may be any dielectric ceramic material.

$BaTiO_3$ with $Al_2O_3$ and $SiO_2$ additions can also be applied.

In one embodiment, proposed is a DESD where a DESE (Dense Energy Storage Element) is the basic building block. In another embodiment calcium copper titanium oxide (also known CCTO or calcium copper titanate) can be synthesized to create an internal barrier layer material with a permittivity of ~600,000 or more.

Although specific embodiments of the subject matter have been disclosed, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

Overview of Various Embodiments

1. A Dielectric Energy Storage Element (DESE) with Multilayer Electrodes comprised of:
  One or more dielectric layers which form a dielectric stack, and
  Where the one or more dielectric materials in the respective one or more dielectric layers are comprised of IBLC particles packed as an agglomerate of individual IBLC particles, and
  Where each IBLC particle is an internal barrier layer capacitor (IBLC) with a resistive material shell, and
  Where opposing electrodes are on both sides of each dielectric material layer, and
  Where the opposing electrodes are multilayer electrodes that have a surface electrode on the dielectric material and extend conductive nano-channels into the dielectric material, and
  Where conductive paths extending from Multilayer Electrodes can provide an electrical charge extended into the dielectric material and can charge the individual IBLC particles within the dielectric material.
2. The DESE of embodiment 1, where the electrodes and collectors are multilayer electrodes that have a surface electrode on the dielectric material and extend electrically conductive nano-channels into the dielectric material.
3. The DESE of embodiment 1, where one dielectric layer with opposing multilayer electrodes form a single layer ceramic capacitor with a right and left terminal for electrical connection and where one of the terminals connects to a positive charge and the other connects to a negative charge.
4. The DESE of embodiment 1, where two or more dielectric layers with opposing multilayer electrodes interleaved in between the dielectric layers form a multilayer ceramic capacitor with electrode collectors on the left and right connecting alternating electrodes forming a left and right electrode collector and terminal for electrical connections connection and where one of the terminals connects to a positive charge and the other connects to a negative charge.

5. The DESE of embodiment 1, where the resistive shell on the IBLC Particle is comprised of silicon dioxide ($SiO_2$).

6. The DESE of embodiment 1, where the dielectric layers have electrically conductive materials added to the dielectric material to distribute the electrical charge from the multilayer electrode(s) across the dielectric material(s) and charge the IBLC particles.

7. The DESE of embodiment 1, in which one or more of the dielectric materials are oxides.

8. The DESE of embodiment 1, in which one or more of the dielectric materials are perovskites.

9. The DESE of embodiment 1, where the one or more Multilayer Electrodes are comprised of metallic and other materials that control metallic migration, and where the material controlling metal migration is a non-metallic or an oxide material, and where the Multilayer Electrode's metallic material is allowed to penetrate into the dielectric material through metallic migration at a controlled depth, and where the Multilayer Electrode's penetration into the dielectric material extends the electrical field into the dielectric material.

10. The DESE of embodiment 1, wherein a non-metallic material is selected from conducting carbon, graphite, graphene or any related carbon-based material.

11. The DESE of embodiment 1, in which one or more of the dielectric materials are CCTO, CCTO/$Al_2O_3$, and or CCTO/$Al_2O_3$@$SiO_2$.

12. The DESE of embodiment 1, in which one or more of the dielectric materials are $BaTiO_3$, $BaTiO_3$/$Al_2O_3$, and or $BaTiO_3$/$Al_2O_3$@$SiO_2$.

13. A method of fabrication of a DESE using a press, tape cast, spray deposition and inkjet processes comprising:
a) creating a dielectric ceramic film using tape cast or press methods, and
b) coating one or more dielectric films with a thin resistive layer using spray deposition, and
c) depositing one or more electrodes that are multilayer electrodes deposited on one or more of the dielectric films; and
d) where the deposited electrodes comprise deposited electrode layers that are interleaved between the combined one or more dielectric films.

14. The DESE of embodiment 1, where one or more DESE Elements are combined to store and provide electrical power to at least one of:
micro devices and integrated circuits, electric vehicles, aircraft, boats, ships, unmanned aerial, terrestrial or water vehicles, mobile computing devices, laptops, tablets, mobile phones, wireless communication devices, and mobile sensor systems, energy storage for an electric power grid, power backup, energy storage for solar, wind, and other alternative energy generation systems, and uninterruptible power supplies.

15. The DESE of embodiment 1, where one or more DESE Elements are combined to store and provide electrical power to at least one of: electronic circuit comprised of single and multilayer devices.

16. The DESE of embodiment 1, where one or more DESE Elements are combined to form a multilayer electronic device, a circuit pattern, a battery, a capacitor, and/or an energy storage capacitor.

17. The DESE of embodiment 1, Where the one or more IBLC particles with a resistive shell that are packed as an agglomerate of individual IBLC Particles each release energy during self-discharge and this energy passes around the one or more IBLC particles via the electric nano-channels providing a regenerated charge into said IBLC particles as it moves to the to the surface electrode.

18. A method of fabrication of the DESE of embodiment 1, where electrically conductive nano-particle are mixed with the IBLC particles in the dielectric layer mixture and when the one or more dielectric layers are sintered together, the electrically conductive nano-particles form electrically conductive nano-channels around the IBLC particles that connect to the surface electrodes residing on each individual dielectric layer.

19. A method of fabrication of the DESE of embodiment 1, where electrically conductive nano-particles are mixed with the IBLC particles in the dielectric material of the dielectric layer and where one or more dielectric layers are sintered together, the conductive nano-particles forming electrically conductive nano-channels around the IBLC particles and connecting to surface electrodes disposed on each individual dielectric layer.

20. A method of fabrication of a DESE using at least one process selected from the following: a press, tape cast, spray deposition, and inkjet processes, comprising:
a) creating a dielectric ceramic film using tape cast or press methods, and
b) coating one or more dielectric films with a thin resistive layer using spray deposition, and
c) depositing one or more electrodes that are multilayer electrodes deposited on one or more of the dielectric films; and
d) where the deposited electrodes are interleaved between the combined one or more dielectric films.

21. The method of fabrication of the DESE of embodiment 20, further comprising:
mixing electrically conductive nano-particles with IBLC particles in dielectric material;
creating the dielectric ceramic film with the dielectric material; and
sintering together the one or more dielectric films with the interleaved deposited multilayer electrodes, forming electrically conductive nano-particles in dielectric material in each of the one or more dielectric films into electrically conductive nano-channels around the IBLC particles and that electrically connect to one or more surface electrode layers disposed directly on the one or more dielectric films.

22. A Dielectric Energy Storage Element (DESE), comprising:
a) one or more dielectric layers forming a dielectric stack, where one or more dielectric materials in the one or more dielectric layers are comprised of IBLC particles packed as an agglomerate of individual IBLC particles, and where each IBLC particle is an internal barrier layer capacitor (IBLC) with a resistive material outer shell;
b) a set of electrode layers including a first set of electrode layers respectively disposed directly on a side surface of each dielectric layer and a second set of electrode layers respectively disposed directly on an opposing side surface of each dielectric layer; and c) at least one electrode layer disposed directly on a side surface of a dielectric layer including one or more extended conductive paths through nano-channel electric interconnections extending from the electrode layer into the dielectric material inside the dielectric layer, for providing an electrical charge extended from the electrode layer into the dielectric material inside the dielectric layer for charging individual IBLC particles within the dielectric material inside the dielectric layer.

23. The DESE of embodiment 22, where the one or more dielectric layers comprises one dielectric layer, and where the first set of electrode layers includes a first one electrode layer disposed directly on a side surface of the one dielectric layer and the second set of electrode layers includes a second one electrode layer disposed directly on an opposing side surface of the one dielectric layer; and at least one electrode layer of the first one electrode layer and the second one electrode layer including one or more extended conductive paths through nano-channel electric interconnections extending from the at least one electrode layer into the dielectric material inside the one dielectric layer, for providing an electrical charge extended from the at least one electrode layer into the dielectric material inside the one dielectric layer for charging individual IBLC particles within the dielectric material inside the one dielectric layer.

24. The DESE of embodiment 22, where the one or more dielectric layers comprise a plurality of dielectric layers stacked together to form the dielectric stack, and where the set of electrode layers comprises a plurality of electrode layers interleaved between the plurality of dielectric layers stacked together, the plurality of electrode layers including the first set of electrode layers respectively disposed directly on a side surface of each dielectric layer in the plurality of dielectric layers and a second set of electrode layers respectively disposed directly on an opposing side surface of each dielectric layer in the plurality of dielectric layers; and at least one electrode layer, disposed directly on a side surface of a dielectric layer in the plurality of dielectric layers, including one or more extended conductive paths through nano-channel electric interconnections extending from the at least one electrode layer into the dielectric material inside the dielectric layer in the plurality of dielectric layers, for providing an electrical charge extended from the at least one electrode layer into the dielectric material inside the dielectric layer for charging individual IBLC particles within the dielectric material inside the dielectric layer.

25. The DESE of embodiment 24, where the plurality of dielectric layers comprise at least three dielectric layers stacked together to form the dielectric stack, and where the plurality of electrode layers is interleaved between the at least three dielectric layers stacked together, and is electrically connected together forming a multilayer electrode; and where at least one electrode layer of the multilayer electrode, disposed directly on a side surface of a dielectric layer in the at least three dielectric layers, including one or more extended conductive paths through nano-channel electric interconnections extending from the at least one electrode layer into the dielectric material inside the dielectric layer in the at least three dielectric layers, for providing an electrical charge extended from the at least one electrode layer into the dielectric material inside the dielectric layer for charging individual IBLC particles within the dielectric material inside the dielectric layer.

26. The DESE of embodiment 25, where each electrode layer of the plurality of electrode layers electrically connected together forming the multilayer electrode, is disposed directly on a side surface of a dielectric layer in the at least three dielectric layers, and includes one or more extended conductive paths through nano-channel electric interconnections extending from the each electrode layer into the dielectric material inside the dielectric layer in the at least three dielectric layers, for providing an electrical charge extended from the each electrode layer into the dielectric material inside the dielectric layer for charging individual IBLC particles within the dielectric material inside the dielectric layer.

27. The DESE of embodiment 26, where a conductive collector electrically connects together the plurality of electrode layers forming the multilayer electrode.

Non-Limiting Examples

The present invention may be implemented as a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a Memory Stick®, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk®, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present specification may describe components and functions implemented in the embodiments with reference to particular standards and protocols, the invention is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings are to be regarded in an illustrative rather than a restrictive sense.

The Abstract is provided with the understanding that it is not intended be used to interpret or limit the scope or meaning of the claims. In addition, in the Detailed Description section, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description section, with each claim standing on its own as a separately claimed subject matter.

Although only one processor might be illustrated for an information processing system, information processing systems with multiple central processing units (CPUs) or processors can be used equally effectively. Various embodiments of the present invention can further incorporate interfaces that each includes separate, fully programmed microprocessors that are used to off-load processing from the processor. Additionally, various embodiments can include an input user interface, and an output user interface, or both. Examples of input user interfaces can include, for example and not for limitation, a mouse, a keyboard, a keypad, a touchpad, or a microphone for receiving uttered voice commands and input data. Examples of output user interfaces can include, for example and not for limitation, a display, lights, lamps, tactile output devices, or a speaker for outputting audible signals and/or voice responses to received uttered voice commands and input data.

An operating system included in main memory for a processing system may be a suitable multitasking and/or multiprocessing operating system, such as, but not limited to, any of the Linux®, UNIX®, Windows®, and Windows® Server based operating systems. Various embodiments of the present invention are able to use any other suitable operating system. Various embodiments of the present invention utilize architectures, such as an object oriented framework mechanism, that allow instructions of the components of the operating system to be executed on any processor located within an information processing system. Various embodiments of the present invention are able to be adapted to work with any data communications connections including, but not limited to, present day analog and/or digital techniques, via wired communication, via wireless communication, via short range wireless communication, via long range wireless communication, via optical communication, via fiber optics communication, via satellite communication, or via a future networking mechanism.

The terminology used herein is for the purpose of describing particular embodiments only and is not intended to be limiting of the invention. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted herein by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The corresponding structures, materials, acts, and equivalents of all means or step plus function elements in the claims below are intended to include any structure, material, or act for performing the function in combination with other claimed elements as specifically claimed.

The description of the present application has been presented for purposes of illustration and description, but is not intended to be exhaustive or limited to the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

Although specific embodiments of the invention have been disclosed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

It should be noted that some features of the present invention might be used in one embodiment thereof without use of other features of the present invention. As such, the foregoing description should be considered as merely illustrative of the principles, teachings, examples, and exemplary embodiments of the present invention, and not a limitation thereof.

In addition, these embodiments are only examples of the many advantageous uses of the innovative teachings herein. In general, statements made in the specification of the present application do not necessarily limit any of the various claimed inventions. Moreover, some statements may apply to some inventive features but not to others.

What is claimed is:

1. A Dielectric Energy Storage Element (DESE), comprising:
   a) one or more dielectric layers forming a dielectric stack, where one or more dielectric materials in the one or more dielectric layers are comprised of IBLC particles packed as an agglomerate of individual IBLC particles, and where each IBLC particle is an internal barrier layer capacitor (IBLC) with a resistive material outer shell;
   b) a set of electrode layers including a first set of electrode layers respectively disposed directly on a side surface of each dielectric layer and a second set of electrode layers respectively disposed directly on an opposing side surface of each dielectric layer; and
   c) at least one electrode layer disposed directly on a side surface of a dielectric layer including one or more extended conductive paths through nano-channel electric interconnections extending from the electrode layer into the dielectric material inside the dielectric layer, for providing an electrical charge extended from the electrode layer into the dielectric material inside the dielectric layer for charging individual IBLC particles within the dielectric material inside the dielectric layer.

2. The DESE of claim 1, where the one or more dielectric layers comprise one dielectric layer, and where the first set of electrode layers includes a first one electrode layer disposed directly on a side surface of the one dielectric layer and the second set of electrode layers includes a second one electrode layer disposed directly on an opposing side surface of the one dielectric layer; and
   at least one electrode layer of the first one electrode layer and the second one electrode layer including one or more extended conductive paths through nano-channel electric interconnections extending from the at least one electrode layer into dielectric material inside the one dielectric layer, for providing an electrical charge extended from the at least one electrode layer into the dielectric material inside the one dielectric layer for charging individual IBLC particles within the dielectric material inside the one dielectric layer.

3. The DESE of claim 1, where the one or more dielectric layers comprise a plurality of dielectric layers stacked together to form the dielectric stack, and where the set of electrode layers comprises a plurality of electrode layers interleaved between the plurality of dielectric layers stacked together, the plurality of electrode layers including the first set of electrode layers respectively disposed directly on a side surface of each dielectric layer in the plurality of dielectric layers and a second set of electrode layers respectively disposed directly on an opposing side surface of each dielectric layer in the plurality of dielectric layers; and at least one electrode layer, disposed directly on a side surface of a dielectric layer in the plurality of dielectric layers, including one or more extended conductive paths through nano-channel electric interconnections extending from the at least one electrode layer into dielectric material inside the dielectric layer in the plurality of dielectric layers, for providing an electrical charge extended from the at least one electrode layer into the dielectric material inside the dielectric layer for charging individual IBLC particles within the dielectric material inside the dielectric layer.

4. The DESE of claim 3, where the plurality of dielectric layers comprise at least three dielectric layers stacked together to form the dielectric stack, and where the plurality of electrode layers is interleaved between the at least three dielectric layers stacked together, and is electrically connected together forming a multilayer electrode; and where at least one electrode layer of the multilayer electrode, disposed directly on a side surface of a dielectric layer in the at least three dielectric layers, including one or more extended conductive paths through nano-channel electric interconnections extending from the at least one electrode layer into the dielectric material inside the dielectric layer in the at least three dielectric layers, for providing an electrical charge extended from the at least one electrode layer into the dielectric material inside the dielectric layer for charging individual IBLC particles within the dielectric material inside the dielectric layer.

5. The DESE of claim 4, where each electrode layer, of the plurality of electrode layers electrically connected together forming the multilayer electrode, is disposed directly on a side surface of a dielectric layer in the at least three dielectric layers, and includes one or more extended conductive paths through nano-channel electric interconnections extending from the each electrode layer into dielectric material inside the dielectric layer in the at least three dielectric layers, for providing an electrical charge extended from the each electrode layer into the dielectric material inside the dielectric layer for charging individual IBLC particles in the dielectric material inside the dielectric layer.

6. The DESE of claim 5, where a conductive collector electrically connects together the plurality of electrode layers forming the multilayer electrode.

7. A Dielectric Energy Storage Element (DESE) with multilayer electrodes comprised of;

one or more dielectric layers forming a dielectric stack;
where dielectric material in the one or more dielectric layers is comprised of IBLC particles packed as an agglomerate of individual IBLC particles;
where each IBLC particle is an internal barrier layer capacitor (IBLC) with an outer resistive material shell;
where opposing electrodes are disposed directly on both opposing sides of each dielectric layer;
where the opposing electrodes are multilayer electrodes that have a surface electrode directly on the dielectric layer and extend electric nano-channels into the dielectric material inside the dielectric layer; and
where conductive paths of electric nano-channels extending from multilayer electrodes provide a path for electrical charge extended into the dielectric material of the dielectric layer for charging the individual IBLC particles within the dielectric material.

8. The DESE of claim 7, where electrode collectors are multilayer electrodes that have a surface electrode on the dielectric layer and extend electric nano-channels into the dielectric material inside at least one of the one or more dielectric layers.

9. The DESE of claim 7, where one dielectric layer with opposing multilayer electrodes form a single layer ceramic capacitor with a right and left terminal for electrical connection and where one of the right and left terminals connects to a positive charge and the other one connects to a negative charge.

10. The DESE of claim 7, where two or more dielectric layers are stacked together forming stacked dielectric layers with opposing multilayer electrodes interleaved in between the stacked dielectric layers forming a multilayer ceramic capacitor with a left electrode collector terminal on a left side of the stacked dielectric layers and a right electrode collector terminal on a right side of the stacked dielectric layers, and where left and right electrode collectors respectively connect to alternating electrode layers forming left and right electrode collector terminals and providing electrical connections and where one of the left and right electrode collector terminals for connecting to a positive charge and the other one of the left and right electrode collector terminals for connecting to a negative charge.

11. The DESE of claim 7, where the outer resistive shell on the IBLC particle is comprised of silicon dioxide ($SiO_2$).

12. The DESE of claim 7, where each one of the one or more dielectric layers has electrically conductive materials added to dielectric material in the each one dielectric layer to distribute the electrical charge from the surface electrode of each multilayer electrode across the dielectric material inside the each one dielectric layer and to charge the IBLC particles.

13. The DESE of claim 7, in which the dielectric material in the one or more dielectric layers comprises oxides.

14. The DESE of claim 7, in which the dielectric material in the one or more dielectric layers comprises perovskites.

15. The DESE of claim 7, where the multilayer electrodes are comprised of metallic and other material that controls metal migration, and a) where the material controlling metal migration is a non-metallic or an oxide material, and
b) where metallic material of the multilayer electrodes is allowed to penetrate into dielectric material in the one or more dielectric layers through metallic migration at a controlled depth, and
c) where the penetration of metallic material of the multilayer electrodes into the dielectric material extends electric field of the multilayer electrodes into the dielectric material in the one or more dielectric layers.

16. The DESE of claim 15, wherein a non-metallic material is selected from conducting carbon, graphite, graphene or any related carbon-based material.

17. The DESE of claim 7, in which the dielectric material comprises at least one of the following: CCTO, CCTO/$Al_2O_3$, and/or CCTO/$Al_2O_3$@$SiO_2$.

18. The DESE of claim 7, in which the dielectric material comprises at least one of the following: $BaTiO_3$, $BaTiO_3$/$Al_2O_3$, and/or $BaTiO_3$/$Al_2O_3$@$SiO_2$.

19. The DESE of claim 7, where one or more DESE elements are combined to store and provide electrical power to at least one of:

micro devices and integrated circuits, electric vehicles, aircraft, boats, ships, unmanned aerial, terrestrial or water vehicles, mobile computing devices, laptops, tablets, mobile phones, wireless communication devices, and mobile sensor systems, energy storage for an electric power grid, power backup, energy storage for solar, wind, and other alternative energy generation systems, and uninterruptible power supplies.

20. The DESE of claim 7, where one or more DESE elements are combined to store and provide electrical power to at least one of: electronic circuit comprised of single and multilayer devices.

21. The DESE of claim 7, where one or more DESE elements are combined to form a multilayer electronic device, a circuit pattern, a battery, a capacitor, and/or an energy storage capacitor.

22. The DESE of claim 7, where the one or more IBLC particles with a resistive shell that are packed as an agglomerate of individual IBLC particles each release energy during self-discharge and this energy passes around the one or more IBLC particles via electric nano-channels providing a regenerated charge into said IBLC particles as it moves to the surface electrode.

23. The DESE according to claim 7, comprising:
electrically conductive nano-particles mixed with IBLC particles in the dielectric material of a dielectric layer in the one or more dielectric layers; and
the one or more dielectric layers being sintered together, the electrically conductive nano-particles forming electric nano-channels around the IBLC particles and connecting to one or more surface electrodes disposed directly on the dielectric layer in the one or more dielectric layers.

\* \* \* \* \*